United States Patent
Wille et al.

(10) Patent No.: US 6,869,997 B2
(45) Date of Patent: Mar. 22, 2005

(54) POLYMERIZATION OF FLUOROMONOMERS USING A 3-ALLYLOXY-2-HYDROXY-1-PROPANESULFONIC ACID SALT AS SURFACTANT

(75) Inventors: Roice Andrus Wille, Malvern, PA (US); Lotfi Hedhli, Ardmore, PA (US); Mehdi Durali, West Whiteland Township, PA (US); Sayed Youssef Antoun, Brussels (BE)

(73) Assignee: Arkema, Inc., Philadelphia, PA (US)

( * ) Notice: Subject to any disclaimer, the term of this patent is extended or adjusted under 35 U.S.C. 154(b) by 0 days.

(21) Appl. No.: 10/430,079

(22) Filed: May 6, 2003

(65) Prior Publication Data

US 2004/0225053 A1 Nov. 11, 2004

(51) Int. Cl.[7] .............................................. C07C 69/52
(52) U.S. Cl. ...................... 524/544; 524/805; 526/246; 526/247; 526/222; 525/196
(58) Field of Search .................................. 524/544, 805; 526/222, 246, 247; 525/196

(56) References Cited

U.S. PATENT DOCUMENTS

| | | | | |
|---|---|---|---|---|
| 4,171,282 A | * | 10/1979 | Mueller | 516/69 |
| 4,360,652 A | | 11/1982 | Dohany | 526/210 |
| 4,524,197 A | | 6/1985 | Khan | 526/206 |
| 4,569,978 A | | 2/1986 | Barber | 526/206 |
| 5,282,976 A | * | 2/1994 | Yeung | 210/697 |
| 5,763,552 A | | 6/1998 | Feiring et al. | 526/214 |
| 5,880,204 A | | 3/1999 | McCarthy et al. | 524/520 |
| 6,013,747 A | | 1/2000 | Abusleme et al. | 526/206 |
| 6,140,408 A | * | 10/2000 | McCarthy et al. | 524/506 |
| 2002/0133072 A1 | * | 9/2002 | Wang et al. | 600/423 |
| 2003/0118629 A1 | * | 6/2003 | Scholz et al. | 424/443 |

FOREIGN PATENT DOCUMENTS

| | | |
|---|---|---|
| EP | 0 721 974 | 7/1999 |
| EP | 0 816 397 | 2/2001 |
| WO | WO96/06887 | 3/1996 |
| WO | WO 97/14720 | 4/1997 |
| WO | WO 97/17381 | 5/1997 |
| WO | WO 98/20055 | 5/1998 |

OTHER PUBLICATIONS

Odian, George G., "Principles of Polymerization", 3rd edition, Wiley, see pp. 243–259, 1991.*
Claude Tournut, "Thermoplastic Copolymers of Vinylidene Fluoride", *Modern Fluoropolymers*, Edited by John Scheirs, Chapter 31, pp. 557–571, John Wiley & Sons Ltd. (1997).
Product description and literature for Sipomer COPS® 1, downloaded from Rhodia Internet Web site on May 1, 2003: http://www.rhodia–hpcii.com/hpcii/product_detail.jsp?Product%3C%3Eprd_id=845524441902227&Folder%3C%Efolder_id=2534374302170989&bmUID=1051710584867.
Patent Abstracts of Japan Abstracting Application No. 55147433, "Polymerization of Fluorine–Containing Monomer", Filed on Oct. 21, 1980, Date of Publication: Apr. 30, 1982, Applicant: Nok Corp.

* cited by examiner

*Primary Examiner*—David W. Wu
*Assistant Examiner*—Henry S. Hu
(74) *Attorney, Agent, or Firm*—RatnerPrestia

(57) ABSTRACT

Fluoropolymers are prepared by a process comprising polymerizing at least one fluoromonomer in an aqueous reaction medium containing monomer, a radical initiator and a 3-allyloxy-2-hydroxy-1-propanesulfonic acid salt as surfactant. The medium may optionally contain one or more of an antifoulant, a buffering agent and a chain-transfer agent.

39 Claims, No Drawings

POLYMERIZATION OF FLUOROMONOMERS USING A 3-ALLYLOXY-2-HYDROXY-1-PROPANESULFONIC ACID SALT AS SURFACTANT

FIELD OF THE INVENTION

The present invention relates to methods of polymerization of fluoromonomers.

BACKGROUND OF THE INVENTION

Fluoropolymers are primarily produced via heterogeneous polymerization reactions, including suspension, emulsion and microemulsion systems. Generally, each of these reactions requires at least one monomer and a radical initiator in a suitable reaction medium. In addition, emulsion polymerizations of halogenated monomers generally require a surfactant capable of emulsifying both the reactants and the reaction products for the duration of the polymerization reaction. The surfactant of choice in the synthesis of fluoropolymers is generally a perfluoroalkyl surfactant. The most common perfluoroalkyl surfactant in the production of halogenated polymers is ammonium perfluorooctanoate (APFO). Non-fluorinated surfactants typically are not used, because they have the disadvantages of inhibiting the reaction, and affecting the molecular weight and other properties of the product, such as color.

The emulsion polymerization of vinylidene fluoride ($VF_2$) using a fluorinated surfactant and isopropyl peroxydicarbonate (IPP) as a free-radical initiator, is taught in U.S. Pat. No. 3,475,396. This polymerization process has since been refined to provide polymers having various improved properties. See, U.S. Pat. Nos. 3,857,827, 4,076,929, 4,360,652, 4,569,978, 6,187,885. The emulsion polymerization of $VF_2$ using a partially fluorinated surfactant and an inorganic peroxide initiator is taught in U.S. Pat. No. 4,025,709.

The common use of fluorinated surfactants such as APFO in the emulsion polymerization of fluoromonomers is dictated by the difference in the electronic environment in a fluoromonomer versus that in a nonfluorinated monomer. See, Ameduri et al., "Copolymerization of fluoromonomers: recent developments and future trends", Journal of Fluorine Chemistry, vol. 104, pp. 53–62, 2000; the entire contents of which is incorporated herein by reference.

The presence of hydrocarbon compounds, including non-fluorinated hydrocarbon surfactants, in radical polymerization reactions of fluoromonomers such as $VF_2$, leads to chain-transfer. Examples of such non-fluorinated surfactants include sodium dodecyl sulfate (SDS), sodium dodecyl benzenesulfonate, and polyoxyethylene alkyl phenyl ether.

The chain-transfer associated with non-fluorinated hydrocarbon surfactants is due to the ease of atom transfer from the hydrocarbon to the forming polymer. For example, measurement of transfer constants from alcohols to polymerizing tetrafluoroethylene has been shown to be two to three orders of magnitude higher than transfer constants to polymerizing methyl methacrylate under otherwise identical reaction conditions. See, Berger et al., "Transfer Constants to Solvents and Additives," *Polymer Handbook*, 3$^{rd}$ Edition, part E, Section II, pp. 106, 110, 111, 121, John Wiley & Sons, New York, 1989. The higher transfer constants for fluoropolymers result in decreased process rates and prevention of the generation of desired high-molecular-weight polymers. For this reason, fluorinated surfactants are presently the surfactant of choice in emulsion polymerization of fluoromonomers.

The use of perfluorinated surfactants has recently become the focus of increasing scrutiny due to safety and environmental concerns. A primary property of perfluoroalkyl surfactants that underlies their utility in polymerization reactions is their stability to the reaction conditions. Because of their resistance to chemical degradation, fluoroalkyl surfactants have the potential to accumulate in the environment and in organisms.

Several different approaches have attempted to reduce or eliminate perfluoroalkyl surfactants as components in the polymerization of fluoromonomers.

Some emulsion polymerization processes have been demonstrated which employ partially fluorinated surfactants instead of perfluorinated surfactants. See, U.S. Pat. Nos. 4,524,197, 5,763,552. Another attempt to reduce the amount of perfluoroalkyl surfactant in heterogeneous polymerization has involved utilization of fluorinated surfactant—non-fluorinated hydrocarbon surfactant combinations. However, this modification served to substantially lower the rate of the reaction. See, WO 95-08598A, the entire disclosure of which is incorporated herein by reference.

In another modification, the perfluoroalkyl surfactant was eliminated by employing a surfactant-free polymerization process. The process relies on the use of metal salts as promoters. See, WO 97 17381 and *J. Appl. Polym. Sci.*, 2211, 70, 1998. The metal salts can, however, contaminate the product.

An alternative approach to stabilizing emulsion polymerizations involves the use of copolymerizable surfactants. A copolymerizable surfactant serves as both a comonomer and as a surfactant. Copolymerizable surfactants are particularly useful in preparing coatings. Examples of copolymerizable surfactants in polymerization of fluoromonomers include: Fluorinated vinyl ether sulfonates or carboxylates in making vinylidene fluoride polymer and copolymers (Tsuda et at., patent publication WO 96/06887 A1); unsaturated polyether/anionic sulfonate, carboxylate, or phosphate, and unsaturated polyether in making fluoropolymers (Naniwa et al., Japan published unexamined patent application laid-open patent HEI{SEI} 9-316144, 9 Dec. 1997); and unsaturated polyether in making chlorotrifluoroethylene copolymers (Kodama, Shun-ichi et al., Japan, published unexamined patent application laid-open patent HEI{SEI} 9-59560, 4 Mar. 1997).

The sodium salt of 2-hydroxy-3-(2-propenyloxy)-1-propanesulfonic acid corresponds to Chemical Abstract (CA) number [52556-42-0]. The Chemical Abstracts name for CA[52556-42-0] is 1-propanesulfonic acid, 2-hydroxy-3-(2-propenyloxy)-, monosodium salt. The chemical name generally employed for the free acid is 3-allyloxy-2-hydroxy-1-propanesulfonic acid. See, Aldrich Handbook of Fine Chemicals and Laboratory Equipment, 2000–2001, page 50, catalog no. 40,942-1, referencing a 40% aqueous solution of 3-allyloxy-2-hydroxy-1-propanesulfonic acid, sodium salt.

The sodium salt of 3-allyloxy-2-hydroxy-1-propanesulfonic acid is described in a product bulletin published by Rhodia (sodium 3-allyloxy-2-hydroxypropyl sulfonate), as a copolymerizable surfactant recommended for emulsion polymerizations of vinyl acetate, n-butyl acrylate, styrene, vinyl chloride and chloroprene. The product described in the Rhodia bulletin is supplied as a 40% solution in water, and is described as a clear, clean liquid with a specific gravity (25°/25°) of 1.17, a Brookfield viscosity (cps) of 10, and a density (pounds/gallon) of 9.75 (0.97282 g/mL). Use of this polymerizable surfactant for fluoropolymer emulsion polymerization is not disclosed.

New processes for polymerization of fluoromonomers are needed that can utilize non-fluorinated surfactants, thereby reducing or eliminating the required amounts of perfluoroalkyl surfactants.

SUMMARY OF THE INVENTION

The present invention provides a process for preparing a fluoropolymer in an aqueous reaction medium.

The process comprises forming an aqueous emulsion comprising at least one radical initiator, at least one 3-allyloxy-2-hydroxy-1-propanesulfonic acid (hereinafter, "AHPS") salt, and at least one fluoromonomer; and initiating polymerization of said fluoromonomer.

The process may be conducted by providing, in a reactor, an aqueous reaction medium comprising the fluoromonomer, radical initiator, and an AHPS salt in an amount sufficient to establish and maintain an emulsion in the aqueous reaction medium. The aqueous reaction medium optionally further comprises one or more of a buffering agent, an antifoulant, one or more additional non-AHPS surfactants, and a chain-transfer agent. The fluoromonomer is polymerized in the aqueous reaction medium to form a fluoropolymer.

In some embodiments of the invention, the AHPS salt is the only surfactant in the polymerization reaction.

In other embodiments of the invention, the AHPS salt is present in the aqueous reaction mixture in combination with one or more additional non-AHPS surfactants. Such optional additional non-AHPS surfactants may be, for example, perfluoroalkyl surfactants, non-fluorinated hydrocarbon surfactants or siloxane surfactants.

The presence in the aqueous reaction medium of the AHPS salt is understood to precede the step of initiating polymerization. Thus, it will be understood that there is no fluoropolymer present in the aqueous reaction medium prior to the presence of the AMPS salt in the aqueous reaction medium.

In some embodiments of the invention, it is further provided that the presence in the aqueous reaction medium of the AHPS salt precedes the addition to the aqueous reaction medium of any monomer.

In some embodiments of the invention, the AHPS salt comprises an alkali metal salt of AHPS, preferably a sodium, lithium or potassium salt. In other embodiments, the AHPS salt is an ammonium or quaternary amine salt.

In a further embodiment of the invention, a composition is provided for polymerizing a fluoromonomer, said composition comprising, in an aqueous reaction medium, at least one fluoromonomer, at least one radical initiator, and at least one AHPS salt;

provided that said AHPS salt is the only surfactant in said aqueous reaction medium.

In another embodiment of the invention, a composition is provided for polymerizing a fluoromonomer, said composition comprising, in an aqueous reaction medium, at least one fluoromonomer, at least one a radical initiator, at least one AHPS salt, and at least one surfactant which is other than an AHPS salt and other than a perfluoroalkyl surfactant.

In another embodiment of the invention, a stable polymer latex composition is provided, said composition comprising fluoropolymer solids, at least one AHPS salt and at least one radical initiator or decomposition products of said radical initiator, wherein said at least one AMPS salt is the only surfactant present in the composition.

In another embodiment of the invention, a stable polymer latex composition is provided, the composition comprising fluoropolymer solids, at least one AHPS salt, at least one radical initiator or decomposition products of said radical initiator, at least one surfactant which is other than an AHPS salt and other than a perfluoroalkyl surfactant.

In the above embodiments, the at least one surfactant which is other than an AHPS salt is preferably a non-fluorinated hydrocarbon surfactant or a siloxane surfactant or a combination thereof.

The chemical name "3-allyloxy-2-hydroxy-1-propanesulfonic acid" and the abbreviation "AHPS" refer to a compound having the structure:

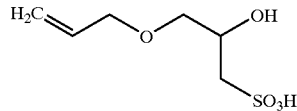

The term "alkyl", by itself or as part of another substituent means, unless otherwise stated, a straight, branched or cyclic chain hydrocarbon radical, including di-radicals, having the number of carbon atoms designated (i.e. $C_1$–$C_8$ means one to eight carbons). Examples include: methyl, ethyl, propyl, isopropyl, butyl, isobutyl, tert-butyl, pentyl, neopentyl, hexyl, cyclohexyl and cyclopropylmethyl. Straight chain alkyl is preferred. ($C_1$–$C_8$)alkyl is particularly preferred. Most preferred is ($C_1$–$C_4$)alkyl, most particularly, methyl.

The term "hydrocarbyl" refers to any moiety comprising only hydrogen and carbon atoms. Hydrocarbyl includes, for example, alkyl, alkenyl, alkynyl, aryl and benzyl groups. Preferred is ($C_1$–$C_8$)hydrocarbyl, more preferably phenyl and ($C_1$–$C_8$)alkyl, most preferably methyl.

The terms "substituted" and "substitution" mean that an atom or group of atoms has replaced hydrogen as the substituent attached to another group. The term "substituent" likewise refers to the atom or group of atoms replacing hydrogen. In naming a substituent, the name of the atom or group of atoms will, in many cases, specifically refer to a chemical entity with an unpaired electron. Examples include methyl, phenyl, hydroxyl, sulfhydryl and carboxyl. In other cases, the substituent will be named as a "radical" of a neutral chemical entity, not in the sense of a reactive intermediate that is actually generated, but rather to provide conceptually an unpaired electron at the point of attachment of the substituent group. An example of this terminology is, "a siloxane substituted on an alkyl side-chain by a polar group selected from a monosaccharide radical, a pyrrolidinone radical and a polyether radical."

The expression "quaternary amine salt" refers to a salt wherein the cation forming the salt is $NR_4^+$, wherein each R is independently selected from—H and an alkyl moiety, preferably ($C_1$–$C_8$)alkyl. Examples include $N(CH_3)_4^+$, $N(C_4H_{10})_4^+$ and $N(C_2H_5)_2H_2^+$. The expression "ammonium salt" refers to a quaternary amine salt wherein each R is —H, i.e., the group $NH_4^+$.

The term "fluoromonomer" or the expression "fluorinated monomer" means a polymerizeable olefin which contains at least one fluorine atom, fluoroalkyl group, or fluoroalkoxy group attached to the double bond of the olefin that undergoes polymerization.

The term "polymer" is intended to be inclusive of homopolymers, copolymers, terpolymers and higher polymers.

The term "fluoropolymer" means a polymer formed by the polymerization of at least one fluoromonomer. Preferred fluoropolymers include, for example, polyvinylidene fluoride and copolymers containing at least 50 mole percent of vinylidene fluoride copolymerized with at least one comonomer selected from the group consisting of tetrafluoroethylene, trifluoroethylene, chlorotrifluoroethylene, hexafluoropropylene, vinyl fluoride, pentafluoropropene. Other co-monomers that would readily copolymerize with vinylidene fluoride may also be used in generating fluoropolymers according to the present invention.

The term "initiator" and the expressions "radical initiator" and "free radical initiator," refer to a chemical with a low energy bond that is capable of providing a source of free radicals, either induced spontaneously, or by exposure to heat or light. Examples of initiators include peroxides, peroxydicarbonates and azo compounds. The term/ expression also includes redox systems useful in providing a source of free radicals.

The expression "initiating polymerization," as a step in the process of the present invention, refers to a point in time at which the polymerization reaction is commenced. Fluoromonomer reactant begins to be consumed and fluoropolymer product begins to be formed. Prior to the initiation of the reaction, no polymer product is present in the aqueous reaction medium. Initiation of the polymerization reaction requires that the monomer, a surfactant and a radical initiator be present under conditions wherein a reactive free radical species is formed. This initial free radical, once formed, begins a free radical chain reaction whereby propagation steps serve to generate a growing polymer molecule and additional free radical intermediates that participate in the polymerization reaction.

The term "radical" and the expression "free radical" refer to a chemical species that contains at least one unpaired electron.

The term "siloxane" refers to a siloxane polymer formed of a backbone of repeating siloxane (—O—Si—) units comprising two hydrocarbyl moieties attached to each silicon atom, with the terminal silicon group comprising —Si(hydrocarbyl)$_3$:

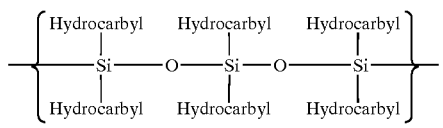

The expression "siloxane surfactant" refers to a surfactant compound whose chemical structure comprises a hydrophilic portion and also a hydrophobic portion that includes at least one dihydrocarbylsiloxane unit:

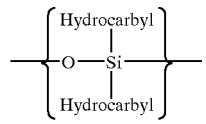

DETAILED DESCRIPTION OF THE INVENTION

According to the present invention, fluoropolymers are prepared by polymerization reactions, particularly emulsion polymerization reactions, that employ an AHPS salt as a surfactant. At least one fluoromonomer is polymerized in an aqueous reaction medium in the presence of at least one radical initiator and at least one AHPS salt, provided that said AHPS salt is present in the aqueous reaction medium prior to the initiation of the polymerization of the fluoromonomer. Thus, the polymerization of the fluoromonomer to form a fluoropolymer does not occur prior to the presence of the AHPS salt in the aqueous reaction medium. There is thus no fluoropolymer present in the aqueous reaction medium prior to the presence of the AHPS salt in the aqueous reaction medium.

In some embodiments, the presence of the AHPS salt in the aqueous reaction medium precedes the addition of any monomer to the aqueous reaction medium.

Prior art methods for preparation of fluoropolymers employ perfluoroalkyl surfactants, even though they are associated with environmental and health concerns. In contrast, the practice of the present invention provides polymerization reactions employing substantially reduced amounts of perfluoroalkyl surfactants, or no perfluoroalkyl surfactants.

Polymerization processes that may utilize an AHPS salt according to the present invention include, for example, emulsion polymerization processes such as those disclosed in U.S. Pat. Nos. 2,559,752; 3,271,341; 3,625,926; 4,262,101; 4,076,929; 4,380,618; 4,569,978; 4,621,116; 4,789,717; 4,864,006; 5,093,427; 5,688,884; 5,763,552; 5,789,508; 6,187,885; 6,395,848; and 6,429,258, the entire disclosures of which are incorporated herein by reference.

According to the present invention, homopolymerization of a fluoromonomer or copolymerization of one or more comonomers, wherein at least one of the monomers is a fluoromonomer, is carried out in an aqueous reaction medium containing at least one radical initiator and at least one AHPS salt as a surfactant. The temperature of the reaction is typically from about 20°° C. to about 160° C., preferably from about 35° C. to about 130° C., most preferably from about 65° C. to about 95° C. Lower and higher temperatures are also possible. The reaction pressure is typically from about 280 to about 20,000 kPa, preferably from about 2,000 to about 11,000 kPa, more preferably from about 2,750 to about 6,900 kPa. Higher pressures than 20,000 kPa may be employed if the reactor and associated equipment will tolerate such pressures.

According to one embodiment, the polymerization reaction is carried out by charging a polymerization reactor with water, (preferably deionized water) at least one AHPS salt, at least one fluoromonomer and optionally, one or more of an additional surfactant, a chain-transfer agent and an antifoulant, wherein air is purged from the reactor prior to the introduction of the fluoromonomer. The reactor contents are preferably agitated and heated to the desired reaction temperature. At least one radical initiator is added to start and maintain the polymerization reaction. Additional monomer may be optionally added to replenish monomer that is consumed.

Fluoromonomers

Fluoromonomers useful in the practice of the invention include, for example, vinylidene fluoride (VF$_2$), tetrafluoroethylene (TFE), trifluoroethylene, chlorotrifluoroethylene (CTFE), hexafluoropropene (HFP), vinyl fluoride, hexafluoroisobutylene, perfluorobutylethylene (PFBE), pentafluoropropene, 3,3,3-trifluoro-1-propene, 2-trifluoromethyl-3,3,3-trifluoropropene a fluorinated vinyl ether, a fluorinated allyl ether, a non-fluorinated allyl ether, a fluorinated dioxole, and combinations thereof.

According to one embodiment, the polymerization method is used to prepare polymers of monomers selected from the group consisting of VF$_2$, TFE, trifluoroethylene, CTFE, vinyl fluoride, and combinations thereof. According to one preferred embodiment, the polymerization method is used to prepare homopolymers of VF$_2$. According to another preferred embodiment, copolymers are prepared by copolymerizing vinylidene fluoride with a comonomer selected from the above list of fluoromonomers, further including hexafluoropropene, hexafluoroisobutylene, perfluorobutylethylene, pentafluoropropene, 3,3,3-trifluoro 1-propene, 2-trifluoromethyl-3,3,3-trifluoropropene, fluorinated vinyl ethers, such as, for example, perfluoromethyl vinyl ether (PMVE); perfluoroethyl vinyl ether (PEVE); perfluoro-n-propyl vinyl ether (PPVE) and perfluoro-2-propoxypropyl vinyl ether; fluorinated and non-fluorinated allyl ethers; and fluorinated dioxoles, such as, for example, perfluoro(1,3-dioxole) and perfluoro(2,2-dimethyl)-1,3-dioxole (PDD). In other embodiments, homopolymers and copolymers may be prepared which do not include vinylidene fluoride. One example is a copolymer of TFE and PMVE.

Particularly, preferred are copolymers of $VF_2$ comprising from about 70 to about 99 mole percent $VF_2$, and correspondingly from about 1 to about 30 mole percent TFE; from about 70 to about 99 mole percent $VF_2$, and correspondingly from about 1 to about 30 mole percent HFP (such as disclosed in U.S. Pat. No. 3,178,399); and from about 70 to about 99 mole percent $VF_2$, and correspondingly from about 1 to about 30 mole percent trifluoroethylene.

The method of the invention is suitable for preparing fluoro terpolymers, such as terpolymers of $VF_2$, HFP and TFE as described in U.S. Pat. No. 2,968,649, and terpolymers of $VF_2$, trifluoroethylene and TFE.

The Radical Initiator

The identity of the radical initiator in the process of the present invention is not critical. The radical initiator is selected from those substances capable of generating radicals under the conditions of the polymerization reaction. The radical initiator may comprise a persulfate salt, such as, for example, potassium persulfate or ammonium persulfate. The radical initiator may comprise an azo initiator, such as, for example, 2,2'-azobis-(2,4-dimethyl-4-methoxyvaleronitrile) or azobisisobutyronitrile (AIBN).

The radical initiator may comprise an organic peroxide such as an alkyl dialkyl, or diacyl peroxide. Preferred peroxides in this class include ($C_1$–$C_6$)alkyl peroxides, e.g., di-tert-butylperoxide (DTBP). Other organic peroxides include peroxy esters, such as tert-amyl peroxypivalate, succinic acid peroxide and tert-butyl peroxypivalate; and peroxydicarbonates, such as, for example, di-n-propyl peroxydicarbonate (NPP) and diisopropyl peroxydicarbonate (IPP).

The radical initiator may comprise a redox system. By "redox system" is meant a system comprising an oxidizing agent, a reducing agent and optionally, a promoter as an electron transfer medium. Oxidizing agents include, for example, persulfate salts; peroxides, such as hydrogen peroxide; hydroperoxides such as tert-butyl hydroperoxide and cumene hydroperoxide; and oxidizing metal salts such as, for example, ferric sulfate. Reducing agents include, for example, sodium formaldehyde sulfoxylate (SFS); sodium and potassium sulfite; ascorbic acid; bisulfite, metabisulfite, and reduced metal salts. The promoter is a component of the redox system which, in different oxidation states, is capable of reacting with both the oxidant and the reducing agent, thereby accelerating the overall reaction. Promoters include, for example, transition metal salts such as ferrous sulfate. Redox systems are described by G. S. Misra, and U. D. N. Bajpai, *Prog. Polym. Sci.*, 1982, 8(1–2), pp. 61–131. A preferred redox system in the practice of the invention comprises potassium persulfate and sodium formaldehyde sulfoxylate, optionally, in combination with a promoter.

The radical initiator is added to the reaction mixture in an amount sufficient to initiate and maintain the polymerization reaction at a desired reaction rate. The order of addition may vary according to the desired process and the latex emulsion characteristics.

Preferred initiators and the amounts added to the reaction mixture (based upon the total weight of monomer added to the reaction mixture), include IPP or NPP, at from about 0.5 to about 2.5 weight percent, and potassium persulfate or ammonium persulfate at from about 0.01 to about 1.0 weight percent. In redox systems, the oxidizing agent and the reducing agent are utilized in an amount from about 0.01 to about 0.5 wt. % (based upon the total weight of monomer added to the reaction mixture). The optional promoter is utilized in an amount from about 0.005 to about 0.025 wt. % (based upon the total weight of monomer added to the reaction mixture).

Chain-Transfer Agents

Chain-transfer agents which may be used are well-known in the polymerization of fluorinated monomers. Oxygenated compounds which may serve as chain-transfer agents in the practice of the present invention include, for example, alcohols, carbonates, ketones, esters, and ethers. Non-limiting, examples of such oxygenated compounds useful as chain-transfer agents include isopropyl alcohol, as described in U.S. Pat. No. 4,360,652; acetone, as described in U.S. Pat. No. 3,857,827; ethyl acetate, as described in published Unexamined Japanese Patent Application (Kokai) JP 58065711, and diethylcarbonate.

Other classes of compounds which may serve as chain-transfer agents in the polymerization of halogen-containing monomers include, for example, halocarbons and hydrohalocarbons, such as chlorocarbons, hydrochlorocarbons, chlorofluorocarbons and hydrochlorofluorocarbons. Non-limiting, examples of such chain-transfer agents include trichlorofluoromethane, as described in U.S. Pat. No. 4,569,978; and 1,1-dichloro-2,2,2-trifluoroethane. In addition, ethane and propane may serve as chain-transfer agents in the polymerization of halogen-containing monomers.

Chain-transfer agents may be added to a polymerization reaction in a single portion at the beginning of the reaction, or incrementally or continuously throughout the reaction. The amount and mode of addition of the chain-transfer agent and the mode of addition depend on the activity of the particular chain-transfer agent employed, and on the desired molecular weight of the polymer product. The amount of chain train transfer agent added to the polymerization reaction is preferably from about 0.05 wt. % to about 5 wt. %, more preferably from about 0.1 wt. % to about 2 wt. % (based upon the total weight of monomer added to the reaction mixture).

AHPS Salt as a Surfactant

An AHPS salt (or a mixture of AHPS salts) may be employed as the sole surfactant type in the practice of the present invention. Generally, the amount of an AHPS salt added to the reaction mixture as the sole surfactant type is from about 0.015 to about 0.3 weight percent, preferably about 0.02 to about 0.2 weight percent, based upon the total weight of monomer added to the reaction mixture.

Alternatively, one or more AHPS salts may be employed as surfactant in combination with one or more non-AHPS surfactants. By "non-AHPS surfactant" is meant a surfactant other than an AHPS salt. The non-AHPS surfactant may comprise a perfluoroalkyl surfactant, for example, ammonium perfluorooctanoate or ammonium mixed perfluoroalkanoates. The amount of perfluoroalkyl surfactant required for an emulsion polymerization may be reduced by combination with an AHPS salt. Perfluoroalkyl surfactants have the general formula R—X—M$^+$, wherein R is a perfluoroalkyl chain typically containing from about 5 to about 16 carbon atoms; X is typically $C_2$; and M$^±$ is a monovalent cation, typically H$^+$, NH$_4^+$ or an alkali metal ion. Ammonium perfluorooctanoate (APFO) is among the most common perfluoroalkyl surfactants. Other perfluoroalkyl surfactants include those disclosed in U.S. Pat. Nos. 2,559,752; 3,271,341; 4,076,929; 4,380,618; 4,569,978; 4,621,116; 4,789,717; 4,864,006; 5,093,427; 5,688,884; 5,763,552; 5,789,508; 6,187,885; 6,395,848; and 6,429,258; the entire disclosures of which are incorporated herein by reference.

The non-AHPS surfactant may comprise one or more non-fluorinated hydrocarbon surfactants. Polymerization with non-fluorinated hydrocarbon surfactants may result in polymer lattices of low stability. Stability may be improved by employing non-fluorinated hydrocarbon surfactant in combination with an AHPS salt. Representative non-fluorinated hydrocarbon surfactants suitable for combination with an AHPS salt include polyoxypropylene-polyoxyethylene block copolymer (e.g., Pluronic® L92) and polyethylene glycol tert-octylphenyl ether (e.g., Triton® X405). The amount of a non-fluorinated hydrocarbon surfactant added to the polymerization reaction in combination with an AHPS salt is from about 0.05 to about 0.3 weight percent, based on the total weight of monomer added to the reaction mixture.

The non-AHPS surfactant may comprise one or more siloxane surfactants. The use of siloxane surfactants in emulsion polymerization of halogenated monomers is disclosed in commonly assigned, copending US patent application entitled, POLYMERIZATION OF HALOGEN-CONTAINING MONOMERS USING SILOXANE SURFACTANT, filed Mar. 28, 2003, the entire disclosure of which is incorporated herein by reference.

Generally, a siloxane surfactant suitable for combination with an AHPS salt in the practice of the present invention has the formula I:

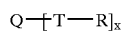

wherein
  Q is a hydrophobic siloxane moiety;
  R is a monovalent hydrophilic moiety; and
  T is —$C_1$-$C_6$)alkylene-, wherein each T is bonded to a silicon atom in Q; and
  X is an integer from 1 to 300; or a salt of such a compound.

The hydrophilic portion of the surfactant may comprise polar moieties including ionic groups such as sulfate, sulfonate, phosphonate, phosphate ester, carboxylate, carbonate, sulfosuccinate, taurate, phosphine oxide (as the free acid, a salt or an ester), betaine, betaine copolyol, quaternary ammonium salt and polyacrylate salt.

The polar moieties of the hydrophilic portion of the siloxane surfactant may also comprise non-ionic groups formed by polyethers. The hydrophilic portion of the siloxane surfactant may include combinations of ionic and non-ionic moieties including ionically end-functionalized or randomly functionalized polyether or polyol.

The arrangement of the hydrophobic and hydrophilic portions in the siloxane surfactant may take the form of a diblock polymer (AB) or triblock polymer (ABA), wherein the "B" represents the siloxane portion of the molecule. The arrangement may also take the form of a multi-block polymer. The siloxane surfactant may alternatively comprise a graft polymer. The term "graft polymer" refers to a polymer comprising molecules with one or more polymeric functionalities connected to the main polymer backbone as sidechains. The sidechains, or grafts, have structural or functional characteristics that differ from the characteristics of the main polymer backbone. Each graft to the main polymer backbone is a "pendant group." The structure of the graft may be linear, branched or cyclic.

A graft polymer siloxane surfactant may comprise a hydrophobic main polymer backbone of dihydrocarbylsiloxane units to which one or more hydrophilic grafts are bonded. One structure comprising multiple grafts onto a main polymer backbone is a "rake" type structure (also called "comb"). A rake-type siloxane structure is compared to an ABA siloxane structure, below. Also see, R. Hill, Id at pages 5–6.

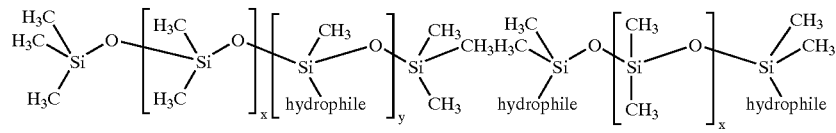

Rake-type structure        ABA-type structure

An additional structure type, related to the rake-type structure, is a trisiloxane. A trisiloxane structure is depicted below.

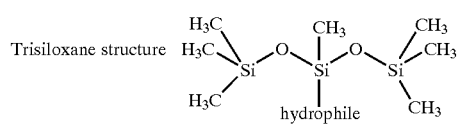

Trisiloxane structure

Representative siloxane surfactants which may be used in combination with an AHPS salt in the polymerization of fluoromonomers include, for example:
  polyalkyleneoxidemethylsiloxane copolymer;
  polyethyleneglycol-8 dimethicone;
  polyalkyleneoxide modified heptamethyltrisiloxane;
  polyalkyleneoxide modified polydimethylsiloxane;
  siloxane polyalkylene oxide copolymer;
  polyalkyleneoxide methylsiloxane copolymer;
  polyalkyleneoxide modified polymethylsiloxane;
  organomodified polydimethylsiloxane;
  polyether modified polysiloxane;

polysiloxane betaine;

ABA silicone polyol copolymer;

dimethylsiloxane ethylene oxide block copolymer;

dimethylsiloxane-(60% propylene oxide-40% ethylene oxide)block copolymer;

poly(dimethylsiloxane)-graft-polyacrylates; and combinations thereof.

Table 1, below lists these representative siloxane surfactants by generic name and also provides, if available, a trade name, Chemical Abstract Registry designation and selected chemical properties. For mixed polyethylene oxide/polypropylene oxide polyethers (PEO/PPO), the mole percent of ethylene oxide (EO) is stated.

The weight percent of the siloxane portion of the listed siloxane surfactants was estimated by proton NMR analysis. For this analysis, the relative mole fractions of polyether moieties, Si—$CH_2$ and Si—$CH_3$, were determined and normalized to the Si—$CH_2$ signal. The relative mole fractions and the formula weights of the siloxane partial structures were then used to estimate the siloxane weight percentage in each surfactant.

TABLE 1

Siloxane Surfactants

| Trade name | CAS # | Manufacturer | Siloxane content wt. % manufacturer | Siloxane content wt. % experimental | Structure type | Wt. % EO in PEO/PPO | Formula weight | Generic Name |
|---|---|---|---|---|---|---|---|---|
| Niax ® Silicone L-1000 | Not available | Crompton Corp. | Not available | 16. | — | — | — | Polyalkyleneoxidemethyl-siloxane copolymer |
| Silsoft ® 810 | 102783-01-7 | Crompton Corp. | Not available | 48. | — | — | — | Polyethyleneglycol-8 dimethicone |
| Silwet ® L-77 | 27306-78-1 | Crompton Corp. | Not available | 31. | trisiloxane | 100 | 600 | Polyalkyleneoxide modified heptamethyl-trisiloxane |
| Silwet ® L-7087 | 67762-85-0 | Crompton Corp. | Not available | 19. | pendant | 40 | 20000 | Polyalkyleneoxide modified polydimethyl-siloxane |
| Silwet ® L-7200 | 68937-55-3 | Crompton Corp. | Not available | 24. | pendant | 75 | 19000 | Siloxane polyalkylene oxide copolymer |
| Silwet ® L-7210 | 68937-55-3 | Crompton Corp. | Not available | 7. | pendant | 20 | 13000 | Polyalkyleneoxide modified polydimethylsiloxane |
| Silwet ® L-7220 | 68937-55-3 | Crompton Corp. | Not available | 12. | pendant | 20 | 17000 | Polyalkyleneoxide methylsiloxane copolymer |
| Silwet ® L-7230 | 68937-55-3 | Crompton Corp. | Not available | 20. | pendant | 40 | 29000 | Polyalkyleneoxide methylsiloxane copolymer |
| Silwet ® L-7280 | 134180-76-0 | Crompton Corp. | Not available | 29. | trisiloxane | 60 | 600 | Polyalkyleneoxide modified heptamethyltrisiloxane |
| Silwet ® L-7600 | 68938-54-5 | Crompton Corp. | Not available | 15 | pendant | 100 | 4000 | Polyalkyleneoxide modified polydimethylsiloxane |
| Silwet ® L-7602 | 68938-54-5 | Crompton Corp. | Not available | 52. | pendant | 100 | 3000 | Polyalkyleneoxide modified polydimethylsiloxane |
| Silwet ® L-7604 | 68937-54-2 | Crompton Corp. | Not available | 29. | pendant | 100 | 4000 | Siloxane polyalkylene oxide copolymer |
| Silwet ® L-7605 | 68938-54-5 | Crompton Corp. | Not available | 16. | pendant | 100 | 6000 | Polyalkyleneoxide modified polydimethylsiloxane |
| Silwet ® L-7607 | 117272-76-1 | Crompton Corp. | Not available | 21. | pendant | 100 | 1000 | Polyalkyleneoxide modified polymethylsiloxane |
| Silwet ® L-7608 | 67674-67-3 | Crompton Corp. | Not available | 32. | trisiloxane | 100 | 600 | Polyalkyleneoxide modified heptamethyltrisiloxane |
| Silwet ® L-7644 | Not available | Crompton Corp. | Not available | 26. | pendant | 100 | 5000 | Organomodified polydimethylsiloxane |
| Silwet ® L-7650 | 68937-54-2 | Crompton Corp. | Not available | 54. | pendant | 100 | 3000 | Polyalkyleneoxide modified polydimethylsiloxane |
| Silwet ® L-7657 | 68937-54-2 | Crompton Corp. | Not available | 21. | pendant | 100 | 5000 | Polyalkyleneoxide modified polydimethylsiloxane |
| Silwet ® L-8610 | 102783-01-7 | Crompton Corp. | Not available | 48. | linear | 100 | 1700 | Siloxane polyalkylene oxide copolymer |
| Silwet ® L-8620 | 102783-01-7 | Crompton Corp. | Not available | 57. | linear | 100 | 2000 | Siloxane polyalkylene oxide copolymer |
| Tegopren ® 5830 | Not available | Goldschmidt Chemical Corp. | Not available | 46. | ABA | 45 | — | Polyether modified polysiloxane |
| Tegopren ® 5840 | 68937-55-3 | Goldschmidt Chemical Corp. | Not available | 25. | rake | 60 | — | Polyether modified polysiloxane |
| Tegopren ® 5843 | Not available | Goldschmidt Chemical Corp. | Not available | 24. | rake | 100 | — | Polyether modified polysiloxane |
| Tegopren ® 5851 | Not available | Goldschmidt Chemical Corp. | Not available | 23. | rake | 75 | — | Polyether modified polysiloxane |
| Tegopren ® 5857 | Not available | Goldschmidt Chemical Corp. | Not available | 21. | — | 90 | — | Polyether modified polysiloxane |
| Tegopren ® 5863 | Not available | Goldschmidt Chemical Corp. | Not available | 18. | rake | 40 | — | Polyether modified polysiloxane |
| Tegopren ® 5873 | Not available | Goldschmidt Chemical Corp. | Not available | 19 | rake | 35 | — | Generic chemical name not available from MSDS |
| Tegopren ® 5884 | Not available | Goldschmidt Chemical Corp. | Not available | 36. | rake | 77 | — | Polyether modified polysiloxane |
| Tegopren ® 6950 | Not available | Goldschmidt Chemical Corp. | Not available | not measured | rake, betaine | — | — | Polysiloxane betaine |

TABLE 1-continued

Siloxane Surfactants

| Trade name | CAS # | Manufacturer | Siloxane content wt. % manufacturer | Siloxane content wt. % experimental | Structure type | Wt. % EO in PEO/PPO | Formula weight | Generic Name |
|---|---|---|---|---|---|---|---|---|
| GP-675 | 151662-01-0 | Genesee Polymers Corp. | 63 | 59. | ABA | <100 | 7970 | ABA silicone polyol copolymer |
| GP690 | 102783-01-7 | Genesee Polymers Corp. | 63 | 59. | ABA | 100 | 3170 | ABA silicone polyol copolymer |
| DBE-712 | 27306-78-1 | Gelest Inc. | 25 | 32. | trisiloxane | 100 | 600 | Dimethylsiloxane ethylene oxide block copolymer |
| DBE-732 | 67762-85-0 | Gelest Inc. | 30–35 | 18. | rake | 40 | 20000 | Dimethylsiloxane-(60% propylene oxide-40% ethylene oxide)block copolymer |
| none | Not available | Sigma Aldrich 56,456-7 (solid) 44,203-8 (aqueous) | 80 | not measured | — | NA | 26000 | Poly(dimethylsiloxane)-graft-polyacrylates |

The generic chemical names of the siloxane surfactants listed in Table 1 are as listed in the Material Safety Data Sheets (MSDS) supplied by the manufacturers listed in Table 1. The chemical names of several of the siloxane surfactants listed in Table 1 comprise certain descriptive nomenclature, such as the terms "modified" and "organo-modified" that are well known in the art.

According to the present invention, an AHPS salt is the principal surfactant in the aqueous reaction medium. Thus, when an AHPS salt is added to a polymerization reaction in combination with one or more non-AHPS surfactants, the one or more non-AHPS surfactants are typically and preferably added in an amount that would be insufficient to establish or maintain the emulsion in the aqueous reaction medium if the one or more non-AHPS surfactants were the only surfactants added to the reaction. In a preferred embodiment, the non-AHPS surfactant is not present in the aqueous reaction medium prior to the step of initiating the polymerization of the fluoromonomer to form the fluoropolymer.

Buffering agent

The polymerization reaction mixture may optionally contain a buffering agent to maintain a controlled pH throughout the polymerization reaction. The pH is preferably controlled within the range of from about 4 to about 8, to minimize undesirable color development in the product.

Buffering agents may comprise an organic or inorganic acid or alkali metal salt thereof, or base or salt of such organic or inorganic acid, that has at least one $pK_a$ value and/or $pK_b$ value in the range of from about 4 to about 10, preferably from about 4.5 to about 9.5. Preferred buffering agents in the practice of the invention include, for example, phosphate buffers and acetate buffers. A "phosphate buffer" is a salt of phosphoric acid. An "acetate buffer" is a salt of acetic acid. Non-limiting examples of phosphate buffers include $Na_3PO_4.12H_2O$ (sodium phosphate dodecahydrate), $Na_5P_5O_{10}$ (sodium triphosphate) and $Na_2HPO_4.7H_2O/K_2HPO_4$ Non-limiting examples of acetate buffers include sodium acetate and ammonium acetate.

Buffering agents are preferably employed where potassium persulfate is employed as the radical initiator. A preferred buffering agent for use with persulfate radical initiators is sodium acetate. A preferred amount of sodium acetate buffer is from about 50 wt. % to about 150 wt. %, based on the weight of persulfate initiator added to the reaction. In one preferred embodiment, the initiator feed comprises approximately equal weights of potassium persulfate and sodium acetate in aqueous solution.

The Emulsion Polymerization Process

According to one embodiment of the process of the invention, a pressurized polymerization reactor equipped with a stirrer and heat control means is charged with water, preferably deionized water, one or more AHPS salts and at least one fluoromonomer. According to some embodiments, the mixture may optionally contain one or more of an additional non-AHPS surfactant, a buffering agent, an antifoulant and a chain-transfer agent for molecular weight regulation of the polymer product. The non-AHPS surfactant is preferably selected from the group consisting of a non-fluorinated hydrocarbon surfactant, a perfluoroalkyl surfactant and a siloxane surfactant.

Prior to introduction of the monomer or monomers, air is preferably removed from the reactor in order to obtain an oxygen-free environment for the polymerization reaction. One method of air removal is to subject the reactor to one or more cycles of purges with an inert gas, such as nitrogen or argon. This is generally done by charging the reactor with the reaction medium, e.g., water, preferably deionized water, increasing the temperature to the selected reaction temperature, and pressurizing the reactor with the inert gas. The reactor is then vented to atmospheric pressure. Alternatively, the purge may be accomplished by subjecting the reactor to vacuum followed by purge with the inert gas, or by agitating and purging with inert gas through the vented reactor for a period of time. The purge procedures may be repeated if necessary.

The addition of a paraffin wax or hydrocarbon oil to the reaction serves as an antifoulant to minimize or prevent polymer adhesions to the reactor components. Any long chain saturated hydrocarbon wax or oil can perform this function. The amount of oil or wax added to the reactor is an amount which serves to minimize the formation of polymer adhesions to the reactor components. The amount is generally proportional to the interior surface area of the reactor and may vary from about 1 to about 40 mg per square centimeter of reactor interior surface area. The amount of paraffin wax or hydrocarbon oil is preferably about 5 mg/cm$^2$ of the reactor interior surface area.

The order in which the polymerization components are assembled may be varied, provided that the AHPS salt is present in the aqueous reaction medium prior to the initiation of the polymerization of the fluoromonomer. AHPS salt may also be added to the aqueous reaction medium at later stages of the polymerization reaction.

For example, in one embodiment of the invention, the initial reactor charge may comprise water, preferably deionized water, at least one radical initiator, at least one AHPS salt and, optionally, one or more of an antifoulant, a chain-transfer agent and a buffering agent. Polymerization is then initiated by heating the reactor to a desired reaction temperature and feeding fluoromonomer to the reactor.

According to one sub-embodiment of the aforementioned embodiment, the fluoromonomer polymerization process comprises the steps of:

(a) charging a reactor with water, preferably deionized water, at least one radical initiator, at least one AHPS salt and, optionally, one or more of an antifoulant, a chain-transfer agent and a buffering agent;

(b) purging the reactor with an inert gas;

(c) heating the reactor to a desired reaction temperature; and (d) feeding at least one fluoromonomer to the heated reactor, preferably in an amount sufficient to obtain a pressure in the reactor of at least about 2750 kPa.

Additional amounts of monomer, buffering agent and radical initiator may optionally be fed to the reactor during the fluoromonomer polymerization in amounts sufficient to maintain the polymerization reaction of the fluoromonomer.

The monomer and initiator may be fed simultaneously. Alternatively, incremental feeds or continuous feeds of monomer and initiator may be introduced into the reactor. They are preferably fed at a rate which provides an essentially constant pressure within the reactor.

According to another embodiment of the invention, the initial charge may comprise water, preferably deionized water, at least one AHPS salt and, optionally, one or more of an antifoulant, and a chain-transfer agent. The temperature of the reactor is adjusted to a desired reaction temperature, and at least one fluoromonomer is fed to the reactor, preferably in an amount sufficient to obtain a pressure in the reactor of at least about 2750 kPa. Polymerization is then initiated by feeding at least one radical initiator and optionally a buffering agent to the reactor.

According to one sub-embodiment of the aforementioned embodiment, there is provided a process of polymerization of a fluoromonomer comprising the steps of:

(a) charging a reactor with water, preferably deionized water, at least one AHPS salt and, optionally, one or more of an antifoulant, a buffering agent and a chain-transfer agent;

(b) purging the reactor with an inert gas;

(c) adjusting the reactor to a desired reaction temperature; and (d) feeding at least one fluoromonomer to the heated reactor, preferably in an amount sufficient to obtain a pressure in the reactor of at least about 2750 kPa.; and (e) feeding at least one radical initiator and at least one buffering agent to the reactor.

According to another embodiment of the invention, the initial reactor charge may comprise water, preferably deionized water, an AHPS salt and, optionally, one or more of an antifoulant, a chain-transfer agent and a buffering agent. The reactor is then heated and at least one fluoromonomer is fed to the reactor. Polymerization is then initiated by feeding at least one radical initiator and at least one non-AHPS surfactant to the reactor.

According to one sub-embodiment of the invention, there is provided a process of polymerization of a fluoromonomer in an aqueous reaction medium comprising the steps of:

(a) charging a reactor with water, preferably deionized water, at least one AHPS salt and, optionally, one or more of an antifoulant, a chain-transfer agent and a buffering agent;

(b) purging the reactor with an inert gas;

(c) heating the reactor to a desired reaction temperature;

(d) feeding at least one fluoromonomer to the heated reactor, preferably in an amount sufficient to obtain a pressure in the reactor of at least about 2750 kPa.;

(e) feeding to the reactor a mixture of at least one radical initiator and at least one surfactant other than an AHPS salt.

The reaction temperature may be conveniently controlled by circulation of a controlled temperature heat exchange medium to a jacket surrounding the reactor. The preferred temperature range for polymerization reactions in the practice of the invention is from about 20° C. to about 160° C. The desired temperature depends in part, on the type of radical initiator employed. For two preferred radical initiators, IPP and NPP, the reaction temperature is preferably in the range of from about 75° C. to about 95° C. For reactions wherein the initiator is a persulfate salt, the reaction temperature is preferably in the range of from about 65° C. to about 140° C. For reactions wherein the initiator is di-tert-butyl peroxide, the reaction temperature is preferably in the range of from about 110° C. to about 160° C. For a redox initiation system, the reaction temperature is suitably in the range of from about 10° C. to about 100° C., preferably of from about 30° C. to about 80° C., and more preferably in the range of from about 30° C. to about 60° C.

The reactor pressure is primarily regulated by controlling the feed of gaseous monomer to the reaction. The reaction pressure is typically from about 280 to about 20,000 kPa, preferably from about 2,000 to about 11,000 kPa, more preferably from about 2,750 to about 6,900 kPa.

The feed rate of the initiator is advantageously regulated to maintain the desired polymerization rate. It is economically desirable to run the polymerization reaction as fast as possible, the limiting factors being the capacity of the heat exchange medium in the reactor jacket to remove the heat generated by the exothermic polymerization reaction and the stability characteristics of the latex being made in the reaction.

The monomer feed is terminated when the desired weight of monomer has been fed to the reactor. Additional radical initiator is optionally added, and the reaction is allowed to react out for a suitable amount of time. The reactor pressure drops as the monomer within the reactor is consumed.

Upon completion of the polymerization reaction, the reactor is brought to ambient temperature and the residual unreacted monomer is vented to atmospheric pressure. The aqueous reaction medium containing the fluoropolymer is then recovered from the reactor as a latex. The latex consists of a stable mixture of the reaction components, i.e., water, an AHPS salt, initiator (and/or decomposition products of the initiator) and fluoropolymer solids.

Generally, the latex contains from about 10 to about 50 weight percent polymer solids. The polymer in the latex is in the form of small particles having a size range of from about 30 nm to about 500 nm. The latex may be separated from coagulum by filtration.

When the latex is the desired product, the dispersion recovered from the reactor may be further stabilized by the addition of stabilizing surfactants and further concentrated by known techniques such as creaming or flash evaporation. If a dry product is desired, the reactor latex is coagulated and the recovered polymer is washed and dried by known drying methods. The powdery product can be a substrate for preparation of coatings or may be extruded into pellets for melt processing by extrusion, injection molding, and compression molding.

The practice of the invention is illustrated by the following non-limiting examples.

EXAMPLES

Example 1

Vinylidene fluoride polymerization (AHPS salt surfactant).

Into a 7.5 liter, a horizontally disposed stainless steel reactor was charged 4.100 kg of deionized water, 0.004 kg of paraffin wax, 0.400 kg of an aqueous solution of AHPS sodium salt (0.500 wt. %), and 0.0500 kg of an aqueous solution containing the radical initiator potassium persulfate (2.00 wt. %) and the buffering agent sodium acetate (2.00 wt. %). The reactor was purged with argon and agitated for 30 minutes at room temperature. The reactor was then sealed and heated to about 80° C. $VF_2$ monomer (0.438 kg) was charged into the reactor to a pressure of about 4,480 kPa. The reactor temperature stabilized at about 82° C. Additional amounts of the initiator/buffer solution were added after 4 minutes (0.0300 L), and after 14 minutes (0.0200 L). Time intervals recorded for the reaction were measured from the time that the reactor was fully pressurized with the monomer. The reactor pressure was maintained at 4480 kPa by the addition of $VF_2$ as needed. The average $VF_2$ feed rate was 0.0881 kg/l/hr., computed as the total $VF_2$ fed to the reactor divided by the volume of the reactor and by the time interval from pressurization to the end of the $VF_2$ feed. Additional amounts of the initiator/buffer solution were added as follows during the reaction to maintain the reaction rate: 0.0100 L after 0.858 kg of $VF_2$ had been fed; 0.0100 L after 1.310 kg of $VF_2$ had been fed; and 0.0050 L after 1.830 kg of $VF_2$ had been fed. The total amount of initiator added to the reaction was 0.105 wt. % based on the total weight of monomer added to the reaction mixture, and assuming a density of 1000 g/L for the initiator/buffer solution. The feed of monomer was stopped at 3.6 hours, after 2.380 kg $VF_2$ had been fed to the reactor. Reaction temperature and agitation were maintained for another 0.3 hour. The reactor was then cooled to room temperature and vented. The reactor was emptied of latex, with the latex passing through a 40-mesh stainless steel screen as it was removed. The reactor was rinsed by adding several kg of water with brief agitation. The rinse was then emptied through the stainless steel screen. The solids in the latex and rinse were measured. The latex contained 32.8 wt. % solids. The rinse contained 1.1 wt. % solids. The yield of polymer solids based on total weight of monomer fed to the reactor was 92.9 wt. % for the latex, and 2.0 wt. % for the rinse. The combined total reaction yield was thus 94.9 wt. % of polymer based on total weight of the monomer.

Example 2

Vinylidene fluoride polymerization (AHPS salt surfactant).

Into a 7.5 liter, horizontally disposed stainless steel reactor were charged 4.100 kg of deionized water, 0.004 kg of paraffin wax, 0.400 kg of an aqueous solution of AHPS sodium salt (0.258 wt. %), and 0.080 kg of an aqueous solution containing the radical initiator potassium persulfate (2.00 wt. %) and the buffer sodium acetate (2.00 wt. %). The reactor was purged with argon and agitated for 30 minutes at room temperature. The reactor was then sealed and heated to about 80° C. $VF_2$ monomer (0.443 kg) was charged into the reactor to a pressure of about 4,480 kPa. The reactor temperature stabilized at about 82° C. The reactor pressure was maintained at 4480 kPa by the addition of $VF_2$ als needed. The feed of monomer was stopped at 2.0 hours, after 2.380 kg $VF_2$ had been fed to the reactor. Reaction temperature and agitation were maintained for another 0.3 hour. The reactor was then cooled to room temperature and vented. The reactor was emptied of latex, with the latex passing through a 40-mesh stainless steel screen as it was removed. The reactor was rinsed by adding several kg of water with brief agitation. The rinse was then emptied through the stainless steel screen. The solids in the latex and rinse were measured. The latex contained 32.9 wt. % solids. The rinse contained 2.3 wt. % solids. The yield of polymer solids based on total monomer fed to the reactor was 91.4 wt. % for the latex, and 4.4 wt. % for the rinse. Thus the combined total reaction yield was 95.8 wt. % of polymer based on total monomer.

Example 3

Vinylidene fluoride polymerization (AHPS salt surfactant).

Into a 7.5 liter, horizontally disposed stainless steel reactor were charged 4.740 kg of deionized water, 0.004 kg of paraffin wax, and 0.200 kg of an aqueous solution of AHPS sodium salt (3.00 wt. %). The reactor was purged with argon and agitated for 30 minutes at room temperature. The reactor was then sealed and heated to about 80° C. $VF_2$ monomer (0.408 kg) was charged into the reactor to a pressure of about 4,480 kPa. The reactor temperature stabilized at about 82° C. After the temperature stabilized, an aqueous solution (0.120 kg), containing the radical initiator potassium persulfate (3.50 wt. %) and the buffering agent sodium acetate (3.50 wt. %) was fed to the reactor. The reaction pressure was maintained at 4480 kPa by the addition of $VF_2$ as needed. Additional amounts of initiator/buffer solution were added as follows during the reaction to maintain the reaction rate: 0.0100 L, after 0.804 kg of $VF_2$ had been fed to the reactor; and 0.0100 L after 1.312 kg of $VF_2$ had been fed to the reactor. The feed of monomer was stopped at 3.5 hours, after 2.200 kg $VF_2$ had been fed to the reactor. Reaction temperature and agitation were maintained for another 0.3 hour. The reactor was then cooled to room temperature and vented. The reactor was emptied of latex, with the latex passing through a 40-mesh stainless steel screen as it was removed. The reactor was rinsed by adding several kg of water with brief agitation. The rinse was then emptied through the stainless steel screen. The solids in the latex and rinse were measured. The latex contained 29.3 wt. % solids. The rinse contained 1.1 wt. % solids. The yield of polymer solids based on total monomer fed to the reactor was 95.2 wt. % for the latex, and 2.2 wt. % for the rinse. Thus, the combined total reaction yield was 97.4 wt. % of polymer based on the total weight of monomer.

The median weight-average size of the latex particles was 288 nm, as measured by capillary hydrodynamic fractionation (Matec Applied Sciences CHDF-2000 with a C204 fractionation cartridge and 1X-GR500 eluent at 1.4 mL/min). Polymer solids were obtained by freeze coagulation of a portion of the latex, isolating the solids by vacuum filtration, washing the isolated solids with water, and drying the washed solids at 110° C. in a forced air oven. A plaque was molded from the isolated solids into a disc at 210° C. for 3 minutes, The disc was then tested for rheological property. The measured viscosity of the disc was 4890 Pa-sec. at 230° C. and 100 rad/s. A high molecular weight PVDF commercial sample (MW 314,000 g/mol), prepared without AHPS salt surfactant was characterized by a substantially lower viscosity, 1480 Pa-sec (ARES strain rheometer using a 25 mm parallel plate, 230° C., dynamic oscillatory mode at 3% strain in the frequency range of 0.01 to 100 rad/s).

Example 4
Vinylidene fluoride polymerization (AHPS salt surfactant and a chain-transfer agent).

In this Example, the reaction conditions were the same as those employed in Example 3, but with the addition of ethyl acetate as a chain-transfer agent to regulate the product molecular weight.

Into a 7.5 liter, horizontally disposed stainless steel reactor were charged 4.568 kg of deionized water, 0.004 kg of paraffin wax, 0.200 kg of an aqueous solution of AHPS sodium salt (2.99 wt. %), and 0.172 liters of an aqueous solution of ethyl acetate (7.00 volume %). The reactor was purged with argon and agitated for 30 minutes at room temperature. The reactor was then sealed and heated to about 80° C. $VF_2$ monomer (0.450 kg) was charged into the reactor to a pressure of about 4,480 kPa. The reactor temperature stabilized at about 82° C. After the temperature stabilized, an aqueous solution (0.120 kg), containing the radical initiator potassium persulfate (3.50 wt. %) and the buffering agent sodium acetate (3.50 wt. %) was fed to the reactor. The reaction pressure was maintained at 4480 kPa by the addition of $VF_2$ as needed. Additional amounts of initiator/buffer solution were added as follows during the reaction to maintain the reaction rate: 0.0200 L after 0.644 kg of $VF_2$ had been fed; 0.0100 L after 0.908 kg of $VF_2$ had been fed; 0.0100 L after 1.306 kg of $VF_2$ had been fed; and 0.0100 L after 1.824 kg of $VF_2$ had been fed to the reactor. The feed of monomer was stopped after 2.200 kg $VF_2$ had been fed to the reactor, which corresponded to 4.4 hours following the achieving of reaction pressure. Reaction temperature and agitation were maintained for another 0.3 hour. The reactor was then cooled to room temperature and vented. The reactor was emptied of latex, with the latex passing through a 40-mesh stainless steel screen as it was removed. The reactor was rinsed by adding several kg of water with brief agitation. The rinse was then emptied through the stainless steel screen. The solids in the latex and rinse were measured. The latex contained 29.7 wt. % solids. The rinse contained 0.9 wt. % solids. The yield of polymer solids based on total weight of monomer fed to the reactor was 88.8 wt. % for the latex, and 1.8 wt. % for the rinse. Thus the combined total reaction yield was 90.6 wt. % of polymer based on the total weight of monomer.

A plaque molded from the isolated washed and dried solids obtained from the reaction had a measured viscosity of 2060 Pa-sec, which was significantly lower than the measured viscosity of the polymer product isolated in Example 3 above.

Example 5
Vinylidene fluoride polymerization (mixed surfactant of AHPS salt and ammonium perfluoroalkanoate).

Into a 7.5 liter, horizontally disposed stainless steel reactor were charged 4.200 kg of deionized water, 0.004 kg of paraffin wax, and 0.0021 kg of an aqueous solution of AHPS sodium salt (41.25 wt. %). The reactor was purged with argon and agitated for 30 minutes at room temperature. The reactor was then sealed and heated to about 82° C. An aqueous initiator/surfactant emulsion containing: the radical initiator di-n-propyl peroxydicarbonate (3.00 wt. %) and mixed perfluoroalkanoate ammonium salt (0.0808 wt. %) was then fed to the reactor at a feed rate of 0.004 L/min. This aqueous initiator/surfactant emulsion was prepared in advance by homogenizing a mixture of refrigerated, deionized water, ammonium salts of mixed perfluoroalkanoates, and NPP. The aqueous initiator/surfactant emulsion thus prepared was stored under refrigeration until fed to the reactor. The $VF_2$ monomer (0.500 kg) and aqueous initiator emulsion (0.200 L) were charged into the reactor to bring the initial reaction condition to a pressure of about 4,480 kPa, and a temperature of about 82° C. The reaction pressure was maintained at 4480 kPa by the addition of $VF_2$ as needed. The feed of monomer was stopped 2.5 hours after the initial reaction condition was attained. At the time the monomer feed was stopped, 2.200 kg $VF_2$ had been fed to the reactor. The reaction temperature and the initiator/surfactant emulsion feed were maintained for another 0.2 hours with continued agitation of the reactor contents. The reactor was then cooled to room temperature and vented. The reactor was emptied of latex. The latex was passed through a 40-mesh stainless steel screen. The reactor was rinsed by adding several kg of water with brief agitation. The rinse was then emptied through the stainless steel screen. The solids in the latex and rinse were measured. The latex contained 29.0 wt. % solids. The rinse contained 1.9 wt. % solids. The yield of polymer solids based on total monomer fed to the reactor was 90.9 wt. % for the latex, and 3.5 wt. % for the rinse. Thus the combined total reaction yield was 94.4 wt. % of polymer based on the total weight of monomer.

COMPARATIVE EXAMPLE 1 (C1)
Vinylidene fluoride polymerization (ammonium perfluoroalkanoates surfactant).

In this Example, the reaction conditions were the same as those employed in Example 1 but with substitution of mixed ammonium perfluoroalkanoates for AHPS sodium salt as the surfactant.

Into a 7.5 liter, horizontally disposed stainless steel reactor were charged 4.514 kg of deionized water, 0.004 kg of paraffin wax, 0.0133 kg of an aqueous solution of mixed ammonium perfluoroalkanoates (15.0 wt. %), and 0.025 kg of an aqueous solution containing the initiator potassium persulfate (2.00 wt. %) and the buffering agent sodium acetate (2.00 wt. %). The mixture was purged with argon and agitated for 30 minutes at room temperature. The reactor was then sealed and heated to 80° C. $VF_2$ monomer (0.492 kg) was charged into the reactor to a pressure of about 4,480 kPa. The reactor temperature stabilized at about 82° C. The reactor pressure was maintained at 4480 kPa by the addition of $VF_2$ as needed. The feed of monomer was stopped at 1.9 hours, after 2.380 kg $VF_2$ had been fed to the reactor. Reaction temperature and agitation were maintained for another 0.3 hour. The reactor was then cooled to room temperature and vented. The reactor was emptied of latex. The latex was passed through a 40-mesh stainless steel screen. The reactor was rinsed by adding several kg of water with brief agitation. The rinse was then emptied through the stainless steel screen. The solids in the latex and rinse were measured. The latex contained 32.6 wt. % solids. The rinse contained 4.0 wt. % solids. The yield of polymer solids based on total monomer fed to the reactor was 73.7 wt. % for the latex, and 7.5 wt. % for the rinse. Thus, the combined total reaction yield was 81.2 wt. % of polymer based on total monomer.

COMPARATIVE EXAMPLE 2 (C2)
Vinylidene fluoride polymerization (sodium dodecyl sulfate surfactant).

In the Example, the reaction conditions are the same as those employed in Example 1 but with substitution of sodium dodecyl sulfate (SDS) for AHPS sodium salt as the surfactant.

Into a 7.5 liter, horizontally disposed stainless steel reactor were charged 4.100 kg of deionized water, 0.004 kg of paraffin wax, 0.400 kg of an aqueous solution of sodium dodecyl sulfate (0.563 wt. %), and 0.200 kg of an aqueous solution containing the initiator potassium persulfate (2.00 wt. %) and the buffering agent sodium acetate (2.00 wt. %). The reactor was purged with argon and agitated for 30 minutes at room temperature. The reactor was then sealed and heated to 80° C. $VF_2$ monomer (0.434 kg) was charged into the reactor to a pressure of about 4,480 kPa. The reactor temperature stabilized at about 82° C. The reactor pressure was maintained at 4480 kPa by the addition of $VF_2$ as needed. Additional amounts of initiator/buffer solution were added during the reaction to maintain the reaction rate as follows: 0.0100 L after 0.680 kg of $VF_2$ had been fed; 0.0200 L after 0.848 kg of $VF_2$ had been fed; and 0.0500 L after 1.128 kg of $VF_2$ had been fed. The feed of monomer was stopped at 3.5 hour is, after 2.060 kg $VF_2$ had been fed. Reaction temperature and agitation were maintained for another 0.3 hour. The reactor was then cooled to room temperature and vented. The reactor was emptied of latex. The latex was passed through a 40-mesh stainless steel screen. The reactor was rinsed by adding several kg of water with brief agitation. The rinse was then emptied through the stainless steel screen. The solids in the latex and rinse were measured. The latex contained 27.4 wt. % solids. The rinse contained 6.8 wt. % solids. The yield of polymer solids based on total monomer fed to the reactor was 53.2 wt. % for the latex, and 19.9 wt. % for the rinse. Thus, the combined total reaction yield was 73.1 wt. % of polymer based on total monomer.

The data from the Examples and Comparative Examples are summarized in Table 2.

TABLE 2

| Ex. # | Surfactant | Surfactant Quantity (kg) | Total $VF_2$ (kg) | Mean $VF_2$ Feed Rate, (kg/L-h) | Total Initiator/ Total $VF_2$ (Wt. %) | Total Reaction Yield, Polymer/Total Monomer (Wt. %) |
|---|---|---|---|---|---|---|
| 1 | AHPS | 0.00200 | 2.380 | 0.0881 | persulfate 0.105 | 94.9 |
| 2 | AHPS | 0.00103 | 2.380 | 0.159 | Persulfate 0.067 | 95.8 |
| 3 | AHPS | 0.00600 | 2.200 | 0.0838 | Persulfate 0.223 | 97.4 |
| 4 | AHPS | 0.00598 | 2.200 | 0.0667 | Persulfate 0.270 | 90.6 |
| 5 | AHPS/ Perfluoro- alkanoate | 0.00161 | 2.200 | 0.117 | NPP 1.26 | 94.4 |
| C1 | Perfluoro- alkanoate | 0.00200 | 2.380 | 0.167 | Persulfate 0.021 | 81.2 |
| C2 | SDS | 0.00225 | 2.060 | 0.0785 | Persulfate 0.272 | 73.1 |

The use of an AHPS salt as a surfactant provided polymerization reaction yields that were as high or higher than yields obtained using other representative surfactants. No fluorinated surfactant or other co-surfactant was required to obtain polymerization reaction yields comparable to other representative surfactants. AHPS salts were used at levels substantially at, or lower than the levels typically required for fluorinated surfactants.

AHPS salts provide emulsion polymerization of fluoropolymers without the need for fluorinated surfactants or other co-surfactants, while maintaining reasonable reaction rates, product yields and high product molecular weights.

All references cited herein are incorporated by reference. The present invention may be embodied in other specific forms without departing from the spirit or essential attributes thereof and, accordingly, reference should be made to the appended claims, rather than to the foregoing specification, as indication the scope of the invention.

What is claimed is:

1. A process for preparing a fluoropolymer in an aqueous reaction medium comprising:
   forming an aqueous emulsion comprising at least one radical initiator, at least one 3-allyloxy-2-hydroxy-1-propanesulfonic acid salt, and at least one fluoromonomer, and
   initiating polymerization of said fluoromonomer.

2. The process of claim 1 wherein said 3-allyloxy-2-hydroxy-1-propanesulfonic acid salt is an alkali metal salt, an ammonium salt or a quaternary amine salt.

3. The process of claim 2 wherein said 3-allyloxy-2-hydroxy-1-propanesulfonic acid salt is a sodium salt.

4. The process of claim 1 wherein said at least one fluoromonomer is selected from the group consisting of vinylidene fluoride, tetrafluoroethylene, trifluoroethylene, chlorotrifluoroethylene, vinyl fluoride, and combinations thereof.

5. The process of claim 1 wherein said at least one fluoromonomer comprises vinylidene fluoride.

6. The process of claim 4 wherein said aqueous emulsion further comprises at least one comonomer selected from the group consisting of tetrafluoroethylene, trifluoroethylene, chlorotrifluoroethylene, hexafluoropropene, vinyl fluoride, hexafluoroisobutylene, perfluorobutylethylene, pentafluoropropene, 3,3,3-trifluoro-1-propene, 2-trifluoromethyl-3,3,3-trifluoropropene, a fluorinated vinyl ether, a fluorinated allyl ether, a non-fluorinated allyl ether, a fluorinated dioxole, and combinations thereof.

7. The process of claim 6 wherein said fluorinated vinyl ether is selected from the group consisting of perfluoromethyl vinyl ether, perfluoro-n-propyl vinyl ether, perfluoroethyl vinyl ether, and perfluoro-2-propoxypropyl vinyl ether.

8. The process of claim 6 wherein said fluorinated dioxole is selected from the group consisting of perfluoro(1,3-dioxole) and perfluoro(2,2-dimethyl)-1,3-dioxole.

9. The process of claim 1 wherein said at least one fluoromonomer is selected from the group consisting of tetrafluoroethylene, trifluoroethylene, chlorotrifluoroethylene, vinyl fluoride, and combinations thereof.

10. The process of claim 1, wherein said aqueous emulsion further comprises at least one surfactant other than a 3-allyloxy-2-hydroxy-1-propanesulfonic acid salt.

11. The process of claim 10 wherein said aqueous emulsion is obtained by:

(a) charging a reactor with deionized water, at least one 3-allyloxy-2-hydroxy-1-propanesulfonic acid salt and, optionally, one or more of an antifoulant, a chain-transfer agent and a buffering agent;

(b) heating the reactor to a desired reaction temperature;

(c) feeding at least one fluoromonomer to the heated reactor; and (d) feeding to the heated reactor at least one radical initiator and said at least one surfactant other than a 3-allyloxy-2-hydroxy-1-propanesulfonic acid salt.

12. The process of claim 11 further comprising purging the reactor with an inert gas prior to adjusting the reactor temperature in step (c); and wherein said fluoromonomer is fed to the heated reactor in an amount sufficient to obtain a pressure in the reactor of at least about 2750 kPa.

13. The process of claim 10 wherein said at least one surfactant other than said 3-allyloxy-2-hydroxy-1-propanesulfonic acid salt is selected from the group consisting of a non-fluorinated hydrocarbon surfactant, a perfluoroalkyl surfactant and a siloxane surfactant.

14. The process of claim 13 wherein said non-fluorinated hydrocarbon surfactant is selected from the group consisting of a poly(ethylene oxide/propylene oxide)block copolymer and a poly(ethylene oxide)tert-octylphenyl ether.

15. The process of claim 13 wherein said perfluoroalkyl surfactant is a perfluorooctanoate salt.

16. The process of claim 15 wherein said perfluorooctanoate salt is ammonium perfluorooctanoate.

17. The process of claim 13 wherein said perfluoroalkyl surfactant is a mixed perfluoroalkanoate salt.

18. The process of claim 17 wherein said mixed perfluoroalkanoate salt is an ammonium mixed perfluoroalkanoate.

19. The process according to claim 13 wherein the siloxane surfactant is selected from the group consisting of:

polyalkyleneoxidemethylsiloxane copolymer;
polyethyleneglycol-8 dimethicone;
polyalkyleneoxide modified heptamethyltrisiloxane;
polyalkyleneoxide modified polydimethylsiloxane;
siloxane polyalkylene oxide copolymer;
polyalkyleneoxide methylsiloxane copolymer;
polyalkyleneoxide modified polymethylsiloxane;
organomodified polydimethylsiloxane;
polyether modified polysiloxane;
polysiloxane betaine;
ABA silicone polyol copolymer;
dimethylsiloxane ethylene oxide block copolymer;
dimethylsiloxane-(60% propylene oxide-40% ethylene oxide)block copolymer;
poly(dimethylsiloxane)-graft-polyacrylates; and combinations thereof.

20. The process of claim 1 wherein said radical initiator is a persulfate salt.

21. The process of claim 20 wherein the persulfate salt is selected from the group consisting of ammonium persulfate and potassium persulfate.

22. The process of claim 1 wherein said radical initiator is a peroxydicarbonate compound.

23. The process of claim 22 wherein the peroxydicarbonate compound is selected from the group consisting of diisopropyl peroxydicarbonate and di-n-propyl peroxydicarbonate.

24. The process of claim 1 wherein said radical initiator is an azo compound.

25. The process of claim 24 wherein the azo compound is selected from the group consisting of 2,2'-azobis-(2,4-dimethyl-4-methoxyvaleronitrile) and azobisisobutyronitrile.

26. The process of claim 1 wherein said radical initiator comprises a redox system.

27. The process of claim 26 wherein the redox system comprises a combination of potassium persulfate, sodium formaldehyde sulfoxylate, and optionally a promoter.

28. The process of claim 1 wherein said aqueous emulsion further comprises a buffering agent.

29. The process of claim 28 wherein said buffering agent is present in an amount sufficient to maintain the pH of the aqueous reaction medium in the range of from about 4 to about 10.

30. The process of claim 28 wherein the buffering agent is selected from the group consisting of acetate buffers and phosphate buffers.

31. The process of claim 1 wherein said aqueous emulsion further comprises a chain-transfer agent.

32. The process of claim 31 wherein said chain-transfer agent is selected from the group consisting of alcohols, carbonates, ketones, esters, ethers, chlorocarbons, hydrochlorocarbons, chlorofluorocarbons, hydrochlorofluorocarbons, and combinations thereof.

33. The process of claim 31 wherein said chain-transfer agent is selected from the group consisting of ethane, propane, isopropyl alcohol, acetone, ethyl acetate, diethylcarbonate, trichlorofluoromethane, 1,1-dichloro-2,2,2-trifluoroethane, and combinations thereof.

34. The process of claim 1 wherein said aqueous emulsion is obtained by:

(a) charging a reactor with deionized water, at least one radical initiator, at least one 3-allyloxy-2-hydroxy-1-propanesulfonic acid salt and, optionally, one or more of an antifoulant, a chain-transfer agent and a buffering agent;

(b) heating the reactor to a desired reaction temperature; and (c) feeding at least one fluoromonomer to the heated reactor.

35. The process of claim 34 further comprising purging the reactor with an inert gas prior to adjusting the reactor temperature in step (b); and wherein said fluoromonomer is fed to the heated reactor in an amount sufficient to obtain a pressure in the reactor of at least about 2750 kPa.

36. The process of claim 34, further comprising feeding additional monomer, buffering agent and radical initiator to the reactor, during the fluoromonomer polymerization, in amounts sufficient to maintain the polymerization of said fluoromonomer.

37. The process of claim 1 wherein said aqueous emulsion is obtained by:

(a) charging a reactor with deionized water, at least one 3-allyloxy-2-hydroxy-1-propanesulfonic acid salt and, optionally, one or more of an antifoulant and a chain-transfer agent;

(b) heating the reactor to a desired reaction temperature;

(c) feeding at least one fluoromonomer to the heated reactor; and (d) feeding a radical initiator and a buffering agent to the reactor.

38. The process of claim 37 further comprising purging the reactor with an inert gas prior to adjusting the reactor temperature in step (b); and wherein said fluoromonomer is fed to the heated reactor in an amount sufficient to obtain a pressure in the reactor of at least about 2750 kPa.

39. The process of claim 37, further comprising feeding additional monomer, radical initiator and buffering agent to the reactor during the fluoromonomer polymerization in amounts sufficient to maintain the polymerization of said fluoromonomer.

* * * * *